United States Patent Office 3,098,076
Patented July 16, 1963

3,098,076
1,1 - DIPHENYL - 2 - TERTIARY AMINOMETHYL-3-HYDROXY METHYL - CYCLOPROPANES AND ESTERS THEREOF
Richard Baltzly, Tuckahoe, N.Y., Peter Byrom Russell, Bryn Mawr, Pa., and Narriman B. Mehta, White Plains, N.Y., assignors to Burroughs Wellcome & Co. (U.S.A.) Inc., Tuckahoe, N.Y., a corporation of New York
No Drawing. Filed Aug. 26, 1958, Ser. No. 757,179
11 Claims. (Cl. 260—294.7)

This application is a continuation in part of Ser. No. 618,449, filed October 26, 1956, now abandoned.

The present application relates to a novel family of aminomethylcyclopropanes represented by the formula:

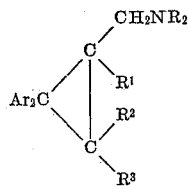

wherein Ar is a phenyl radical and $Ar_2C$ is also an ortho biphenylene radical, $NR_2$ is selected from the class consisting of the lower dialkylamino, piperidino, pyrrolidino and morpholino radicals, $R^1$ and $R^2$ are selected from the class consisting of the lower alkyl radicals and hydrogen and $R^3$ is selected from the class consisting of the lower α-hydroxy alkyl radicals and their esters, the lower acyl radicals and hydrogen.

The compounds and their salts have pronounced physiological activity in the treatment of Parkinsonism. In addition, variants having Ar as phenyl and tolyl, and wherein $R^3$ is $CH_2OH$, CHOHEt, and esters thereof, or COEt and where the cis configuration exists with respect to $CH_2NR_2$ and $R^3$ have pronounced analgesic activity. The analgesic action is especially pronounced and toxicity is low when $R^2$ is $CH_3$.

The general route of synthesis is by reacting a suitable diphenyldiazomethane in an inert solvent with an unsaturated carbonyl compound

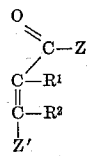

wherein COZ and Z' are groups that are eventually converted to $CH_2NR_2$ and $R^3$ respectively. Typical examples are:

(1)
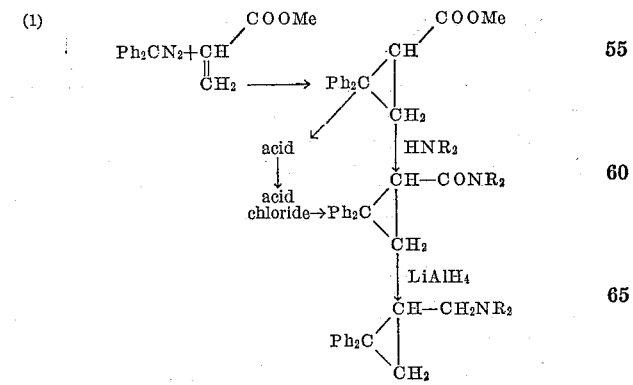

(2)
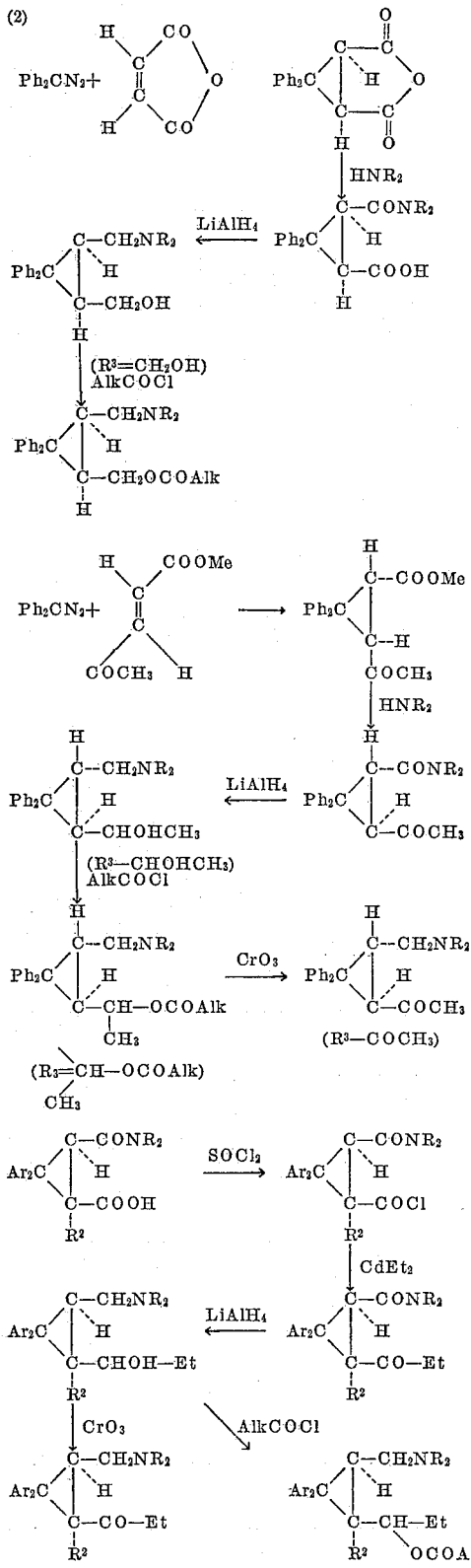

It will be apparent that when $R^2$ and $R^3$ are not both hydrogen, geometrical isomers may exist. In practice, those wherein $CH_2NR_2$ and $R^3$ are cis are prepared from unsaturated cyclic compounds such as maleic anhydride and maleimides and their derivatives. The cis ring system persists through the first reaction stage and, with proper precautions, can be preserved through later stages. Where the original unsaturated reactant does not have its geometry preserved by incorporation in a ring, $CH_2NR_2$ and $R^3$ generally end up trans to each other, i.e., the same product is obtained from dimethyl maleate and dimethyl fumarate.

These compounds, being bases, are capable of forming acid addition salts and it is usually convenient to store and administer them in that form. The bases can also be converted to quaternary salts, whose physiological properties are in some cases especially desirable.

EXAMPLE 1

*Pyrrolidine Amide of 1,1-Diphenylcyclopropane-2-carboxylic Acid*

The acid (4 g.) in benzene (25 ml.) was treated with thionyl chloride (5 mls.) at reflux temperature for 2 hours. At the end of this time the solvent and excess thionyl chloride were removed in vacuo and the residue treated with pyrrolidine (2.4 g.) in benzene (20 mls.). After warming on a steam bath overnight the solid was partitioned between benzene and water, the benzene layer washed with dilute hydrochloric acid and then with sodium carbonate solution; dried and the benzene removed. The residue on recrystallization from ether, benzene-pentane gave 5 g. of colorless prisms, M.P. 129–130°.

*1,1-Diphenyl-2-N-Pyrrolidinomethylcyclopropane Hydrochloride*

The amide (3 g.) was added to a solution (or suspension) of lithium aluminum hydride (0.8 g.; 2 mols) in dry ether (150 mls.). The mixture was stirred and refluxed for 5 hours. The excess hydride was then destroyed by the addition of water and the base extracted from the ether layer with dilute hydrochloric acid. The acidic extract was basified with dilute sodium hydroxide solution and the base extracted with ether. The ethereal solution was dried; the ether was evaporated and the residue converted to the hydrochloride; this salt after recrystallization from methanol-ether appeared as fine colorless needles, M.P. 220°.

EXAMPLE 2

*Pyrrolidine Amide of 1,1-Diphenyl-2-Methylcyclopropyl-2-Carboxylic Acid*

The acid chloride was prepared as in the previous example, with the exception that it was found desirable to avoid the presence of an excess of thionyl chloride. The chloride was converted to the amide which after recrystallization from ether-pentane formed prisms, M.P. 98–101°.

*1,1-Diphenyl-2-Pyrrolidino Methyl-2-Methyl-Cyclopropane Hydrochloride*

The above amide was reduced with lithium aluminum hydride essentially as in the first example. The hydrochloride of the product crystallized from methanol-ether as colorless prisms, M.P. 203°.

EXAMPLE 3

*Cis-1,1-Diphenyl-2-Dimethylcarboxamido-Cyclopropane-3-Carboxylic Acid*

The anhydride of 1,1-diphenylcyclopropane-cis-2,3-dicarboxylic acid (2.64 g.) in benzene (15 ml.) was heated in a pressure bottle on the steam bath with 5 g. of a 30% solution of dimethylamine in ether. Next day the solution, from which crystalline material had separated, was extracted with dilute sodium hydroxide solution. The alkaline solution on acidification with hydrochloric acid gave a precipitate of the amido-acid which after recrystallization from methanol gave 2.8 g. of colorless prisms, M.P. 218°.

*Cis-1,1-Diphenyl-2-Dimethylaminomethyl-3-Hydroxymethylcyclopropane Acid Hydrochloride*

The above amide (2 g.) was added to a suspension of lithium aluminum hydride (1 g.) in ether (50 mls.). The mixture was stirred was refluxed for 24 hours. The excess reagent was then decomposed with water, the ether layer decanted and extracted with dilute hydrochloric acid. The acid extract was then basified and extracted with ether. Removal of the ether gave the amino alcohol which, after recrystallization from ether pentane melted at 90–92° (1.8 g.).

The amino alcohol was converted to the hydrochloride by treatment with dry hydrogen chloride in acetone. On recrystallization from acetone ether this salt formed clusters of plates M.P. 196°.

EXAMPLE 4

*1,1-Diphenyl-2-Dimethylaminomethyl-3-(Cis)-Acetoxy Methyl Cyclopropane Hydrochloride*

This substance can be prepared by the reaction of the dimethylamino alcohol hydrochloride (Example 3) with acetyl chloride—at room temperature. Excess of acetyl chloride may be used as solvent but use of more drastic conditions is to be avoided. The preferred procedure is as follows:

In 20 cc. of nitromethane was suspended 1.5 g. of 1,1-diphenyl - 2 - dimethyl - amino - methyl-3-(cis)-hydroxy-methylcyclopropane hydrochloride (Example 3). To this was added 2 cc. of acetyl chloride. In five minutes the solid hydrochloride had completely dissolved. After standing a further 45 minutes, hexane and ether were added and crystallization was induced by scratching. The product was recrystallized from acetone-ether mixture and then melted at 202°.

EXAMPLE 5

*Pyrrolidine Amide of 1,1-Diphenyl-2,3-Cis-Cyclopropane Dicarboxylic Acid*

Five g. of 1,1-diphenyl-2,3-(cis)-cyclopropane dicarboxylic acid anhydride was dissolved in 10 cc. of pyrrolidine and allowed to stand over-night. In the morning, the solution was diluted with water and basified with sodium hydroxide solution. The resultant solution was extracted with benzene, the extract was discarded and the aqueous layer was acidified with hydrochloric acid. The product precipitated and was filtered off. After recrystallization from methanol, it melted at 257° and had the correct composition for the mono pyrrolidine amide of the starting compound.

EXAMPLE 6

*1,1-Diphenyl-2-Hydroxymethyl-3-(Cis)-Pyrrolidinomethyl Cyclopropane*

Six g. of 1,1-diphenyl-cyclopropane-2-carboxylic acid-3-(cis)-carboxylic acid pyrrolidine amide (Example 5) was added to a slurry of 1 g. of lithium aluminum hydride in 150 cc. of anhydrous ether. The resultant mixture was stirred and refluxed for 40 hours. At the end of that time, 10 cc. of water was added cautiously, the ether was decanted from the precipitated aluminum salts and was washed with water. The ethereal solution was then extracted with dilute hydrochloric acid and the aqueous layer was basified and the oily base was taken into ether and dried over $K_2CO_3$. On evaporation of the solvent the base solidified and melted about 80°.

(a) Two g. of the above base was dissolved in 10 cc. of acetone, 3 g. of methyl iodide was added and the solution was refluxed on the steam-bath. Solid appeared after 10 minutes and reaction appeared to be complete in half an hour. The methiodide melted at 235° and, after crystallization from ethanol-ether mixture at 236° the composition was correct for the methiodide of the tertiary base.

(b) The tertiary base forms a hydrochloride that melts at 214° C.

(c) The above hydrochloride was converted to its acetic acid ester by the method of Example 4. The amino ester hydrochloride forms a hemi-hydrate that melts at 152–153° C.

EXAMPLE 7

Cis-1,1-Diphenyl-2-Piperidinomethyl-3-Hydroxymethyl Hydrochloride

Treatment of the anhydride with piperidine on a steam bath gave the piperidino amido acid corresponding to the dimethylamino derivative described above. This compound, after recrystallization from methanol, melted at 230–231°.

Reduction of this amide by the method previously described gave a solid recrystallizing from ether as colorless prisms, M.P. 145°.

(a) The hydrochloride crystallized from moist ether ethanol with two molecules of water of crystallization, M.P. 120° (eff.). When the dihydrate is crystallized from abs. ethanol-acetone mixture, a monohydrate, M.P. 190°, separates.

(b) The above base (1 g.) was dissolved in 10 cc. of acetone and 1.2 g. of methyl-p-toluene sulfonate was added. The methyl tosylate quaternary salt crystallized and melted at 197° C. After recrystallization from isopropyl alcohol it melted at 200° C.

(c) The hydrochloride monohydrate (a) (4.8 g.) was dissolved in 50 cc. of nitromethane and 5 cc. of acetyl chloride was added. After standing 2½ hours the solvent and excess reagent was blown off by an air-stream and finally removed with gentle warming in vacuo. The glassy residue crystallized from acetone-ether, M.P. 122° C.

EXAMPLE 8

Trans-1,1-Diphenyl-2-Piperidinomethyl-3-Hydroxymethylcyclopropane

Methyl N-piperidinomaleamate (2.1 g.) and diphenyl diazomethane (from 2 g. of benzophenonehydrazone) were reacted in ether (50 ml.). On standing the red-violet color disappeared and crystals separated (4 g.). These crystals after recrystallization from hexane melted at 138° with effervescence.

The above pyrazoline on heating at about 180° evolved nitrogen. The residue after recrystallization from methanol ether melted at 135°.

The above amido-ester was reduced by lithium aluminum hydride in the manner previously described. The amino alcohol, worked up as before, melted at 129° after recrystallization from ether.

The hydrochloride melted at 216° (dec.).

EXAMPLE 9

Trans-1,1-Diphenyl-2-Anilinomethyl-3-Hydromethylcyclopropane

Methyl N-phenylmaleamate (10 g.) was mixed with a solution of diphenyl diazomethane (from 10 g. of hydrazone). After about 1 hour crystals started to separate, after 24 hours some 18 gms. had separated. This material decomposed with evolution of gas at about 180°.

The above pyrazoline was heated at 180–200° until no further evolution of gas occurred. The residue after recrystallization from benzene-hexane formed colorless prisms, M.P. 224°.

The amido ester was reduced with lithium aluminum hydride in the manner described previously. The product obtained in almost quantitative yield crystallized from ether pentane in fine needles, M.P. 72°.

They hydrochloride of the amino alcohol formed prismatic rods, M.P. 168°.

EXAMPLE 10

1,1-Diphenyl-2,3-Cis-Cyclopropanedicarboxylic Acid, Monopiperidinoamide-Acid Chloride

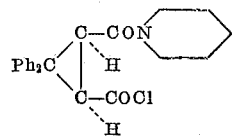

The amido-acid of Example 7 (33 g.) was dissolved in 1.5 l. of benzene and to this was added 87 g. of thionyl chloride. The solution was stirred at a temperature of 70–80° C. for 65 hours and filtered from a small amount of precipitate. The filtrate was concentrated in vacuo leaving a crystalline residue that melted at 187° C. after washing with pentane. It had the correct composition for the acid chloride and readily reverted to the amide acid on exposure to moist air.

EXAMPLE 11

1,1-Diphenyl-2-Propionyl-3-(Cis)-Cyclopropane Carboxylic Acid Piperidinoamide

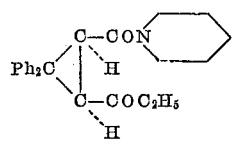

A solution of ethylmagnesium bromide was prepared from 3.6 g. of magnesium, 15 g. of ethyl bromide and 100 cc. of anhydrous ether. This was cooled in an ice bath and 14 g. of anhydrous cadmium chloride was added in portions. The mixture was refluxed for 45 minutes and most of the ether was then allowed to boil off. The darkish residue was diluted with 150 cc. of dry benzene and refluxed for an hour. The amido-acid chloride of Example 10 (31 g.) was then added dissolved in 100 cc. of benzene. There was considerable evolution of heat. When this had subsided the reaction-mixture was stirred and refluxed 20 hours further. It was then cooled in an ice-bath and hydrolyzed with ice and water; acidified with sulfuric acid. The benzene layer was separated and washed successively with water, sodium carbonate solution and with water. On acidification of the sodium carbonate wash there was recovered 1 g. of the amido-acid. The benzene layer was dried over sodium sulfate, filtered and evaporated in vacuo. When the residue was dissolved in ether and pentane was added there separated 13.4 g. of a solid melting at 104–5° and having the correct composition for the desired amido-ketone.

EXAMPLE 12

1,1-Diphenyl-2-Piperidinomethyl-3-Cis-(1'-Hydroxypropyl) Cyclopropane

Seven g. of the above amido-ketone was reduced with lithium aluminum hydride (6 g.) in ether. The reaction mixture was hydrolyzed by addition of a little water. The ethereal solution was decanted from the inorganic salts and evaporated. There was isolated the amino alcohol which exhibits dimorphism. The lower melting form melts at 139–140° and changes on standing to the higher-melting form, M.P. 149–150°. The latter forms a hydrochloride melting at 218° C.

EXAMPLE 13

The above hydrochloride was reacted in nitromethane with acetyl chloride by the method of Example 4 and afforded 1,1-diphenyl-2-piperidinomethyl-3-cis(1'-acetoxypropyl) cyclopropane hydrochloride.

EXAMPLE 14

*1,1-Diphenyl-2-Piperidinomethyl-3-Cis-Propionyl Cyclopropane*

The amino alcohol base (M.P. 149–150°) of Example 12 (0.875 g.) was dissolved in 20 cc. of acetic acid. To this was added gradually a solution of 0.5 g. of chromic anhydride in 50 cc. of acetic acid and 2 cc. of water. The time of addition was 20 minutes and the solution was then warmed at 60° for 15 minutes. The reaction mixture was diluted with water and neutralized with sodium hydroxide solution. The mixture was extracted with ether and the ethereal solution was dried over sodium hydroxide pellets. The ether was evaporated and the residual oil was crystallized from ethyl-acetate-pentane mixture, M.P. 112° C.

EXAMPLE 15

*1,1-Diphenyl-2-Piperidinomethyl-3-Cis-Cinnamoyloxymethyl Cyclopropane*

The amino-alcohol hydrochloride of Example 7a (1.6 g.) was dissolved in 30 cc. of nitromethane and 1 g. of cinnamoylchloride was added. The solution was warmed at 40–50° for 1 hour after which the solvent was blown off with an air-stream. The residual oil was crystallized from acetone-methanol-ether mixture, M.P. 190–196° dec., and had the correct composition for the hydrochloride, hemihydrate of the desired ester-base.

EXAMPLE 16

*Cis-1,1-Diphenyl-2-N-Morpholinomethyl-3-Hydroxymethylcyclopropane*

The reaction of the anhydride with morpoline gave the required amido acid. This crystallized as colorless needles from ethanol, M.P. 249° (dec.).

Reduction of this compound in the usual manner with lithium aluminum hydride gave the hydroxy amine, M.P. 154°, after recrystallization from ether-pentane.

EXAMPLE 17

*Cis-1,1-Diphenyl-2-Benzylmethylaminomethyl-3-Hydroxymethylcyclopropane*

The amido acid prepared in the usual manner from the anhydride, crystallized from methanol in needles, M.P. 149°.

This after reduction with lithium aluminum hydride in the usual manner gave the amino alcohol, M.P. 125°.

EXAMPLE 18

*1,1-Diphenyl-2-Dimethylaminomethyl-3$^c$-Hydroxymethyl-3$^t$-Methylcyclopropane*

The anhydride of 1,1-diphenyl-2-methylcyclopropane-cis-2,3-dicarboxylic acid anhydride was treated with dimethylamine. The acid amide, worked up in the manner previously described, melted at 198–199° after recrystallization from benzene chloroform.

The acid amide was reduced with lithium aluminum hydride in the usual manner. The product, formed in 90% yield, crystallized from ether pentane in colorless prisms, M.P. 144°.

The hydrochloride of this compound melted at 216°.

EXAMPLE 19

*1,1-Diphenyl-2-Piperidinomethyl-3$^c$-Hydroxymethyl-3$^t$-Methylcyclopropane*

The anhydride was reacted with piperidine in the usual manner. The product worked up as before and recrystallized from benzene chloroform, melted at 144–145°.

This amide-acid on treatment with lithium aluminum hydride in the usual manner gave the amino alcohol in quantitative yield. This compound after recrystallization from ether pentane melted at 146–147°.

The hydrochloride melted at 153–154° with effervescence.

EXAMPLE 20

*1,1-Diphenyl-2-Dibutylaminomethyl-3-Cis-Hydroxymethyl-3-Trans-Methyl Cyclopropane*

(a) The anhydride of 1,1-diphenyl-2-methyl cyclopropane-2,3-cis-dicarboxylic acid (5 g.) was reacted with 3 g. of dibutylamine in 50 cc. of benzene at room temperature for 25 hours. The partly solid reaction mixture was shaken with 100 cc. of 5% sodium hydroxide solution and the aqueous layer was acidified with hydrochloric acid. The precipitate after crystallization from benzene weighed 3.5 g. and melted at 112–113° C. It had the correct composition for 1,1-diphenyl-2-dibutylcarboxamido-3-trans-methyl cyclopropane 3-cis-carboxylic acid.

(b) The above amido-acid was reduced by lithium aluminum hydride by the method of Example 3 and the resulting base was converted to the hydrochloride, M.P. 131° C.

EXAMPLE 21

*1,1-Diphenyl-2-Pyrrolidinomethyl-3-Cis-Hydroxymethyl-3-Trans-Methyl Cyclopropane*

The 1,1 - diphenyl-2-methylcyclopropane-2,3-cis-dicarboxylic anhydride (5.5 g.) was reacted with pyrrolidine by the method of Example 20a. The amido acid, which melted at 218° C. was reduced by the method of Example 3 and afforded the desired amino-alcohol. This base is an oil and was therefore converted to its hydrochloride which melts at 159–160° C.

(a) Three g. of the above hydrochloride was acetylated by the method of Example 4 yielding the acetic ester hydrochloride, M.P. 142°.

(b) The amino-alcohol hydrochloride (1.5 g.) was reacted with cinnamoyl chloride by the method of Example 15. The resultant cinnamic ester hydrochloride melted at 145° as a hydrate (with 1.5 H$_2$O as shown by analysis and quantitative desiccation).

EXAMPLE 22

*1,1-Bis-p-Tolyl-Cyclopropane-2,3-Dicarboxylic Acid Anhydride*

In 150 cc. of abs. ether was dissolved 9.2 g. of 4,4'-dimethylbenzophenone hydrazone. To this solution was added 11 g. of mercuric oxide, 1 g. of KOH pellets and 2 cc. of water. The contents of the flask were stirred vigorously with a magnetic stirrer and the Burgundy-red color of the diazo compound developed rapidly. After two hours, the solution was filtered, dried over KOH, and poured into 500 cc. of hexane containing 5 g. of maleic anhydride. The color faded rapidly with evolution of nitrogen and colorless crystals were deposited. The anhydride melts at 109°.

EXAMPLE 23

*Mono Piperidino Amide of 1,1-Di-p-Tolyl-2,3-Cis-Cyclopropane Dicarboxylic Acid*

To 5 cc. of piperidine was added 4.8 g. of the anhydride from Example 22 and the solution was kept at about 50° over-night. The reaction mixture was worked up as described in Example 5 and the amido acid crystallized from isopropyl alcohol, M.P. 207°.

EXAMPLE 24

*1,1-Bis-p-Tolyl-2-Hydroxymethyl-3-(Cis)-Piperidinomethyl Cyclopropane*

Five g. of the above amido-acid was reduced by the method of Example 6. The base obtained was oily. It was divided into two portions.

(a) One-half (2 g.) of the oily base was dissolved in acetone and neutralized by passing in gaseous hydrogen chloride. A solid separated that melted at 105° and at 106° after crystallization from ethanol-ether mixture. This proved to be a monohydrate of the hydrochloride of the piperidino base.

(b) The remaining 2 g. of oily base was dissolved in 10 cc. of acetone and refluxed with 3 g. of methyl iodide. There was obtained the colorless 1,1-bis-p-tolyl-2-hydroxymethyl - 3 - (cis) - piperidino - methyl cyclopropane methiodide. This was crystallized from ethanol-ether mixture and then melted at 210-211°.

EXAMPLE 25

*1,1-Bis-p-Tolyl-2-Dimethylaminomethyl-3-Cis-Hydroxymethyl Cyclopropane*

The anhydride of Example 22 was reacted with dimethylamine by the method of Example 3. The resulting amido acid, M.P. 207-209° (a hydrate), was reduced by the method of Example 3 yielding an oily base whose hydrochloride melts at 221.5-222° C.

EXAMPLE 26

(a) Bis-p-tolyldiazomethane (33 g.) was reacted with citraconic anhydride (16 g.) in 250 cc. of hexane and 150 cc. of ether. On standing over-night the color faded and the solution, on evaporation, yielded 33 g. of the 1,1-bis-p-tolyl-2-methyl cyclopropane-2,3-cis-dicarboxylic acid anhydride.

(b) Ten g. of the above anhydride was added to 17 cc. of a 33% solution of dimethylamine and 50 cc. of benzene in a pressure-bottle. After standing over-night and adding hexane the dimethylamido acid separated, M.P. 195-196°.

(c) The amido-acid (12.5 g.) was reduced by lithium aluminum hydride by the method of Example 3 (using 9 g. of LiAlH₄ in 500 cc. of ether).

The base, isolated by the method of Example 3, formed a hydrochloride melting at 188° C. When crystallized from acetone-ether it comes down as a hydrate.

(d) The above hydrochloride was acetylated by the method of Example 4 yielding the ester hydrochloride, which melts at 140° C. as a hemihydrate.

EXAMPLE 27

*1,1-Bis-p-Tolyl-2-Pyrrolidinomethyl-3-Cis-Hydroxymethyl Cyclopropane*

The anhydride of Example 22 was warmed with pyrrolidine to convert it to the pyrrolidino amido acid, which melts at 175° C. This was then reduced by lithium aluminum hydride by the method of Example 3 to give an oily base. The hydrochloride melts at 213.5-214° C.

EXAMPLE 28

*1,1-Bis-p-Tolyl-2-Piperidinomethyl-3-Cis-Hydroxymethyl-3-Trans-Methylcyclopropane*

The anhydride of Example 26a, after warming with piperidine afforded the amido-acid which melts at 203-203.5° C.

(a) The amido acid (15 g.) when reduced with lithium aluminum hydride (8 g.) by the method of Example 3 afforded the amino alcohol named above. This base forms a hydrochloride that crystallizes as a hemi-hydrate and melts at 210-211.5° C.

(b) The above hydrochloride was acetylated by the method of Example 4 and yielded the acetic ester hydrochloride whose hemi-hydrate melts at 193-195° C.

EXAMPLE 29

*1,1-Bis-p-Tolyl-2-Morpholinomethyl-3-Cis-Hydroxymethyl Cyclopropane*

The anhydride of Example 22 was warmed with morpholine and converted to the morpholino.amido.acid, M.P. 185-190° dec.

The amido-acid (8 g.) was reduced in 600 cc. of ether with 7.6 g. of lithium aluminum hydride. The base, isolated by the method of Example 3 melts at 147-149° when crystallized from hexane. When neutralized by alcoholic hydrogen chloride it crystallizes from alcohol-ether mixture as the hydrochloride, which melts at 267-268° C.

EXAMPLE 30

*1,1-Bis-(p-Chlorophenyl)-2,3-Cyclopropane Dicarboxylic Acid Anhydride*

Twenty g. of 4,4'-dichlorobenzophenone hydrazone was oxidized by the method of Example 22 and reacted with maleic anhydride to yield the desired anhydride which crystallizes in rosettes or needles, M.P. 167°.

EXAMPLE 31

*Mono-Piperidine Amide of 1,1-Bis-(p-Chlorophenyl)-2, 3-Cis-Cyclopropane Dicarboxylic Acid*

The anhydride of Example 30 (8.4 g.) was dissolved in 10 cc. of piperidine and warmed at 80° for 17 hours. The amido acid was isolated by the method of Example 5. It melted at 210°.

EXAMPLE 32

*1,1-Bis-(p-Chlorophenyl)-2-Hydroxymethyl-3-(Cis)-Piperidino Methyl Cyclopropane*

The amide of Example 31 was reduced by the method of Example 6. The resultant tertiary base melted at 143° after crystallization from ether. It forms a hydrochloride melting at 204-205° and a methiodide melting at 267° (dec.)

EXAMPLE 33

*1,1-Bis-p-Chlorophenyl-2-Dimethylaminomethyl-3-Cis-Hydroxymethyl Cyclopropane*

The anhydride of Example 30 was reacted with dimethylamine by the method of Example 3 and the resultant amido-acid was reduced with lithium aluminum hydride by the method of Example 3. The base so formed is an oil: it forms a hydrochloride that melts at 229-230° C.

EXAMPLE 34

*1,1-Bis-p-Chlorophenyl-2-Isopropylaminomethyl-3-Cis-Hydroxymethyl Cyclopropane*

The anhydride of Example 30 (6.5 g.) reacted with isopropylamine (4 g.) in 40 cc. of benzene to yield the corresponding isopropylamido acid, M.P. 196°. This, on reduction by the method of Example 3 gave the amino-alcohol named above which melts at 216-217° C. The hydrochloride melts at 210° C.

EXAMPLE 35

*1,1-Bis-p-Chlorophenyl-2-Pyrrolidinomethyl-3-Cis-Hydroxymethyl Cyclopropane*

The anhydride of Example 30 was reacted with pyrrolidine to give the pyrrolidino-amido acid, M.P. 178°. This was reduced by the method of Example 3 to give the amino-alcohol which melts at 152°. The hydrochloride melts at 219-220° C.

EXAMPLE 36

*1,1-Bis-(p-Methoxyphenyl)-2,3-Cyclopropane Dicarboxylic Acid Anhydride*

Ten g. of 4,4'-dimethoxybenzophenone hydrazone was oxidized to the diazo compound by the method of Example 22. The purple diazo compound can be isolated and crystallized from hexane if so desired. It is extremely reactive in the fashion of other diazo compounds but is not markedly unstable, contrary to earlier reports. The filtered solution was reacted with maleic anhydride by the method of Example 22 and the desired anhydride, M. P. 115°, crystallized from ether-hexane.

EXAMPLE 37

*Mono-N-Dimethylamide of 1,1-Bis-(p-Methoxyphenyl)- Cyclopropane 2,3-Cis-Dicarboxylic Acid*

In a pressure bottle 2.9 g. of the anhydride of Example 36 was mixed with 3 g. of 33% (wt./wt.) solution of dimethylamine in ether. The resultant mixture was allowed to stand over-night and then worked up by the method of Example 5. The amido-acid melts at 194–195°. When suspended in ether and allowed to react with an excess of diazomethane it is converted to the methyl ester which melts at 109° after crystallization from ether-pentane.

EXAMPLE 38

*1,1-Bis-(p-Methoxyphenyl)-2-Hydroxymethyl-3-Cis-Dimethylaminomethyl Cyclopropane*

The above ester (1.8 g.) was reduced by 0.5 g. of lithium aluminum hydride by the method of Example 6. The resultant tertiary base was an oil. It formed a crystalline hydrochloride melting at 207–208°.

What we claim is:

1. 1,1-diphenyl-2-hydroxymethyl-3-(lower)-dialkylaminomethylcyclopropane.
2. A base of the structure

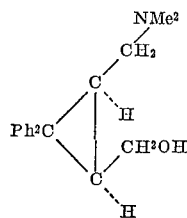

wherein Ph is the phenyl radical.

3. A therapeutically acceptable acid addition salt of the compound of claim 2.

4. A base of the structure

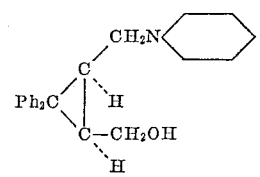

wherein Ph is the phenyl radical.

5. A therapeutically acceptable acid addition salt of the compound of claim 4.

6. 1,1-diphenyl-2-dimethylamino methyl-3-cis-hydroxymethyl-3-trans-methylcyclopropane.
7. A therapeutically acceptable acid addition salt of 1,1-diphenyl-2-dimethylamino methyl-3-cis-hydroxymethyl-3-trans-methylcyclopropane.
8. 1,1-diphenyl-2-pyrrolidinomethyl-3-cis-hydroxymethyl-3-trans-methylcyclopropane.
9. A therapeutically acceptable acid addition salt of 1,1 - diphenyl - 2 - pyrrolidinomethyl-3-cis-hydroxymethyl-3-trans-methylcyclopropane.
10. 1,1 - diphenyl-2-dibutylaminomethyl-3-cis-hydroxymethyl-3-trans-methylcyclopropane.
11. A compound of the formula

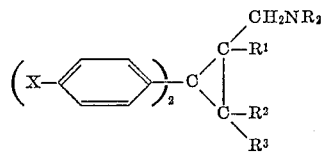

wherein X is selected from the class consisting of hydrogen, methyl, methoxy and chlorine, $NR_2$ is selected from the class consisting of the lower dialkylamino, piperidino, pyrrolidino and morpholino radicals, $R^1$ and $R^2$ are selected from the class consisting of the lower alkyl radicals and hydrogen and $R^3$ is selected from the class consisting of the hydroxymethyl, acetoxymethyl and cinnamyloxymethyl radicals.

References Cited in the file of this patent

Mustafa et al.: J. Am. Chem. Soc., 1434 (1952).
Mustafa et al.: J. Am. Soc., vol. 78, pages 145–148 (1956).